Patented Sept. 5, 1939

2,172,146

UNITED STATES PATENT OFFICE 2,172,146

MANUFACTURE OF ISO-BUTANE

Robert F. Ruthruff, Hammond, Ind., assignor to Standard Oil Company, Chicago, Ill., a corporation of Indiana No Drawing. Application July 20, 1935, Serial No. 32,379

7 Claims. (Cl. 260—676)

This invention relates in general to the isomerization of hydrocarbons and more especially to the manufacture of iso-butane from petroleum hydrocarbons of a gasoline-like nature. My invention is particularly directed to a process of converting a mixture of paraffin hydrocarbons such as straight-run gasoline, kerosene, and naphtha to iso-butane by a catalytic process, preferably with the aid of a suitable promoter.

I have found in catalytically treating petroleum naphthas, such as straight run naphtha of low octane rating, for example Mt. Pleasant naphtha obtained from Michigan crude oil, that excellent yields of iso-butane may be obtained without the production of appreciable amounts of permanent gases. My invention is particularly directed to a process wherein straight run naphthas are used, these naphthas preferably being in the gasoline boiling range but, if desired, in the kerosene boiling range also, extending up to a maximum boiling point of 550° F.

In accordance with my invention, a straight run naphtha treated in a well known manner, such as by acid treatment and a caustic wash, is mixed with a catalyst and the mixture heated to a temperature sufficient to effect the desired reaction. Prior to the heating of the mixture or during the heating thereof, a promoter may be added to the mass being treated and the heating continued while the mass is being constantly agitated at the optimum reaction mass temperature for a sufficient period of time to effect the desired reaction.

Specifically, my invention may be practiced by mixing certain quantities of straight run naphthas with aluminum chloride. The mixture may be formed exterior to a reaction vessel in which it is to be treated or in the vessel itself. After the mixture of naphtha and aluminum chloride is prepared, heat from any suitable source may be applied thereto and the mixture heated to the desired temperature. A promoter, such as water, is preferably added to the mixture during the heating thereof and an average reaction temperature of about 205° F. is maintained for a period of several hours, for instance, from about four to eleven hours, but preferably of about five hours. The mixture is constantly agitated or stirred during the heating and there is formed an overhead product containing a considerable amount of low boiling material even though a reaction temperature of only about 205° F. is employed, which is well below the temperature normally employed in cracking petroleum oils with aluminum chloride. Thus, it has been found that by using relatively low temperatures exceptional yields of iso-butane may be obtained without the formation of permanent gases.

Various promoters may be used and I have found that water, carbon tetrachloride and dry hydrogen chloride gas may be used, the first two being preferred as they are more effective as promoters although my experiments indicate that hydrogen chloride is the true promoter when water and carbon tetrachloride are used. While excellent yields have been obtained in using dry hydrogen chloride gas, it has been found that such a promoter is not quite as effective as the other two. Alkyl halides which in general produce hydrogen chloride gas or hydrogen halide may be used as suitable promoters. Any suitable promoter may be used and when the term promoter appears herein and in the claims, it should be construed to include those substances which are capable of liberating halogen acids, such as hydrogen chloride, after coming in contact with the metallic halide catalyst, such as aluminum chloride.

While it is preferred to gradually add the particular promoter being used to the mixture of petroleum naphtha and aluminum chloride during the heating thereof, all of the promoter may be added to the mixture at the beginning of the operation with excellent results.

During the heating and stirring of the mixture and the promoter, which may be accomplished in the reaction vessel or in a separate coil prior to being introduced into the reaction vessel where it is maintained at the desired temperature, the desired products of reaction formed in the reaction vessel pass overhead as vaporous constituents and are recovered in a well known manner, such as by passing them through suitable reflux condensers and cooled towers well understood by those skilled in the art. The portion of the overhead fraction which is condensed in passing through the reflux condenser, which consists mainly of unreacted charge naphtha is returned to the reaction vessel to therein undergo further reaction. The overhead from the reflux condenser is then passed through a cooled tower wherein the iso-butane and other condensibles are collected. The residue or sludge remaining in the reaction vessel may be removed after an operation or intermittently during the operation and treated in any desired manner to recover the more valuable products therefrom, such as the aluminum chloride and any naphtha included therein. The recovered naphtha and aluminum chloride may be recycled for further treatment, the recovered naphtha being quite similar to the charge naphtha.

The following tabulation shows the inspection of the virgin Mt. Pleasant naphtha, which is a straight run naphtha used in my experiments, the material being first treated with an acid, then caustic washed, distilled and the overhead again caustic washed before being isomerized:

| | |
|---|---|
| Gravity °A. P. I. | 58.3 |
| A. S. T. M. (Distillation) Initial | 256° F. |
| 10% off | 287° F. |
| 50% off | 324° F. |
| Max. | 398° F. |

The following tabulation gives some of the results obtained when producing iso-butane from naphtha of the above inspections in accordance with my invention:

| Run | A | B | C |
|---|---|---|---|
| Temp. °F. | 205 | 205 | 205 |
| Promoter | $H_2O$ | $H_2O$ | HCl |
| Weight promoter | 7.5 | 7.5 | 26.5 |
| Weight naphtha | 552.0 | 559.5 | 557.0 |
| Weight $AlCl_3$ | 188.0 | 188.0 | 161.5 |
| Percent iso-butane | 16.65 | 21.92 | 9.39 |
| Percent N-butane | 0.58 | 0.20 | 0.11 |
| Percent propane | 0.28 | 0.06 | 0.11 |
| Weight decanted naphtha | 304.5 | 319.5 | 399.0 |
| A. S. T. M. dist. (initial) °F. | 74 | 72 | 94 |
| A. S. T. M. dist. (10%) °F. | 227 | 140 | 195 |
| A. S. T. M. dist. (50%) °F. | 329 | 327 | 317 |
| A. S. T. M. dist. (max.) °F. | 444 | 454 | 460 |

It will be observed that in Experiment B, 319.5 grams of naphtha were recovered from the original 559.5 grams employed in the experiment. Thus 240 grams (or 45%) of naphtha were used up. 21.92% was converted to iso-butane which is equivalent to 51% of the naphtha used up.

In Experiment C, 399 grams of naphtha were recovered from an original 557 grams making 158 grams used up or 28.4%. Since 9.39% of iso-butane was produced, this is equivalent to 33.1% of the naphtha used up in the reaction.

No permanent gas was produced in any of the experiments from which the above results were obtained, although a recovery system for permanent gas was provided. Atmospheric pressure was used in all experiments. It will be noted from the above tabulation that the per cent of iso-butane produced was remarkably high, especially since an average reaction temperature of only 205° F. was employed in all of the experiments. In each of the runs, over 95% of the condensibles was iso-butane. The A. S. T. M. distillation inspections set forth in the above tabulation are based on the liquid distillate (decanted naphtha) mixed with the condensibles (iso-butane, n-butane and propane) and show quite clearly the low boiling products obtained.

From the foregoing it is evident that I have provided a process in which straight run naphtha is isomerized to iso-butane. My process makes possible the production of valuable yields of iso-butane from petroleum hydrocarbons, such as straight run naphthas within the gasoline boiling range, although naphthas having a higher boiling range may be used.

It is to be understood that the weight of the promoter, naphtha and aluminum chloride given in the above tabulation are merely illustrative. The weight of each may be varied and generally I prefer to use about 5 to 30% as much aluminum chloride as naphtha and about 5 to 10% as much promoter as aluminum chloride.

While certain temperature conditions have been set forth, it is to be understood that these are merely illustrative and may be varied. Moderately low temperatures are preferred and generally temperatures lower than 400° F. would be employed. I prefer to use temperatures of between 100° and 300° F. If desired, superatmospheric pressures may be maintained on the mass undergoing reaction, the pressure employed being dependent upon the particular temperature to which the mass is subjected. Generally pressures of from atmospheric to 250 pounds per square inch will be used.

While I have specifically disclosed the use of a metallic halide, such as aluminum chloride, as a suitable catalyst, other catalysts may be used. For instance, I may use boron tri-fluoride alone or promoted with hydrogen fluoride or I may use ferric chloride.

The iso-butane produced in accordance with my process may be further processed to produce iso-octane, as for example, it may be dehydrogenated catalytically to iso-butylene which can be polymerized to iso-octene and subsequently hydrogenated to iso-octane or, if desired, the intermediate iso-butylene may be polymerized with a suitable catalyst, such as aluminum chloride or boron fluoride, to produce lubricating oils and plastic resins.

The foregoing specification and examples serve to define the scope of the invention and make its advantages apparent to those skilled in the art to which it pertains. The specific catalyst and promoters heretofore mentioned are given for illustrative purposes and are not intended to restrict the scope of this invention. It will be evident, however, that the invention is not limited to the specific examples cited as many petroleum distillate fractions may be treated with other catalysts and promoters used with advantageous results. The specific examples are not, therefore, to be construed as constituting limitations upon the broad scope of the invention.

I claim:

1. A process of producing iso-butane from saturated petroleum naphthas boiling above 256° F. which comprises forming a mixture of the petroleum naphtha and aluminum chloride, heating said mixture to a temperature above 100° F. but below 400° F., adding hydrogen chloride to said mixture to promote the reaction, and heating said mixture for a sufficient period of time to form a gaseous product consisting mainly of iso-butane and recovering said iso-butane.

2. The method of claim 1 wherein the period of time is about 4 to 11 hours.

3. A process of producing iso-butane from straight run petroleum naphthas which comprises heating in a heating zone an admixture of straight run petroleum naphtha and aluminum chloride in the presence of hydrogen chloride to a temperature within the range of 100° F. to about 300° F., continuing the heating until a substantial part of the petroleum naphtha has been converted into iso-butane without substantial formation of other permanent gases, passing the vapors from said heating zone to a fractionating zone and removing an overhead fraction consisting mostly of iso-butane from said fractionating zone.

4. A process of producing iso-butane from straight run petroleum naphthas which comprises heating in a heating zone an admixture of straight run petroleum naphtha and aluminum chloride in the presence of hydrogen chloride to a temperature within the range of about 100° F. to 300° F., continuing the heating until a substantial part of the petroleum naphtha has been converted into iso-butane without substantial formation of other permanent gases, passing the vapors from said heating zone to a fractionating zone, separating therein gaseous products from liquid products, returning the liquid products from said fractionating zone to the heating zone, and removing the gaseous overhead fraction consisting mostly of iso-butane from said fractionating zone.

5. A process of producing iso-butane from a saturated petroleum naphtha which comprises heating in a reaction zone an admixture of the petroleum naphtha and aluminum chloride in the presence of hydrogen chloride formed in situ to a temperature within the range of 100° F. to 300° F., continuing the heating until a substantial part of the petroleum naphtha has been converted into iso-butane without substantial formation of other permanent gases, withdrawing the vapors from said heating zone as rapidly as they are formed to a fractionating zone and removing an overhead fraction consisting mostly of iso-butane from said fractionating zone.

6. A process of producing iso-butane from straight run petroleum naphthas having a boiling range above 205° F. and below 550° F. which comprises heating an admixture of said straight run petroleum naphtha and aluminum chloride in the presence of hydrogen chloride to a temperature above 100° F. and below 400° F., continuing the heating until a substantial part of the petroleum naphtha has been converted into iso-butane without substantial formation of other permanent gases, and recovering iso-butane from the vapors resulting from the heating of said admixture.

7. The process of producing iso-butane from straight run petroleum naphthas which comprises heating an admixture of straight run petroleum naphtha having an initial boiling point above about 256° F. and final boiling point below 550° F., and aluminum chloride in the presence of hydrogen chloride to a temperature above 100° F. and below 400° F., continuing the heating until a substantial part of the petroleum naphtha has been converted into iso-butane without substantial formation of other permanent gases, and recovering iso-butane from the vapors resulting from the heating of said admixture.

ROBERT F. RUTHRUFF.